US010123167B2

(12) United States Patent
Zimerman et al.

(10) Patent No.: US 10,123,167 B2
(45) Date of Patent: *Nov. 6, 2018

(54) CONTENT REQUEST BY LOCATION

(71) Applicant: Snap Inc., Venice, CA (US)

(72) Inventors: Gadi Zimerman, Hod-HaSharon (IL); Ido Sadeh, Ramat-Gan (IL)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/712,937

(22) Filed: Sep. 22, 2017

(65) Prior Publication Data

US 2018/0014157 A1 Jan. 11, 2018

Related U.S. Application Data

(63) Continuation of application No. 15/371,379, filed on Dec. 7, 2016, now Pat. No. 9,801,018, which is a (Continued)

(51) Int. Cl.
*H04W 4/02* (2018.01)
*H04W 4/60* (2018.01)
(Continued)

(52) U.S. Cl.
CPC ........... *H04W 4/021* (2013.01); *H04W 4/023* (2013.01); *H04W 4/60* (2018.02)

(58) Field of Classification Search
CPC ......... H04L 29/08108; H04L 29/08657; H04L 29/08936; H04W 4/02; H04W 64/00
See application file for complete search history.

(56) References Cited

U.S. PATENT DOCUMENTS 666,223 A 1/1901 Shedlock
5,883,639 A 3/1999 Walton et al.
(Continued)

FOREIGN PATENT DOCUMENTS

WO WO-2001029642 A1 4/2001
WO WO-2013008238 1/2013
WO WO-2016179166 A1 11/2016

OTHER PUBLICATIONS

"Adding a watermark to your photos", eBay, [Online]. Retrieved from the Internet:<URL:http://pages.ebay.com/help/sell/pictures.html>, (accessed May 24, 2017), 4 pgs.
(Continued)

*Primary Examiner* — Sharad Rampuria
(74) *Attorney, Agent, or Firm* — Schwegman Lundberg & Woessner, P.A.

(57) ABSTRACT

A method of obtaining media content of an event, comprising: identifying a real-life event and, a time of said real-life event a geographic location of the real-life event; identifying a subset of a plurality of client terminals of users located in proximity to the geographic location of the real-life event at said time of said real-life event; sending a message to the subset of client terminals containing a request to acquire media content documenting the real-life event; and receiving at least one media content item documenting the real-life event from at least one client terminal of the subset of client terminals, the at least one media content item acquired by at least one user of the users using the at least one client terminal in response to the message.

21 Claims, 4 Drawing Sheets

Related U.S. Application Data continuation of application No. 14/805,489, filed on Jul. 22, 2015, now Pat. No. 9,521,515.

(60) Provisional application No. 62/107,588, filed on Jan. 26, 2015.

(51) Int. Cl.
*H04W 4/021* (2018.01)
*H04W 4/00* (2018.01)

(56) References Cited

U.S. PATENT DOCUMENTS

| | | |
|---|---|---|
| 6,310,694 B1 | 10/2001 | Okimoto et al. |
| 6,334,149 B1 | 12/2001 | Davis, Jr. et al. |
| 6,487,601 B1 | 11/2002 | Hubacher et al. |
| 6,631,463 B1 | 10/2003 | Floyd et al. |
| 6,636,247 B1 | 10/2003 | Hamzy et al. |
| 6,636,855 B2 | 10/2003 | Holloway et al. |
| 6,643,684 B1 | 11/2003 | Malkin et al. |
| 6,665,531 B1 | 12/2003 | Soderbacka et al. |
| 6,684,238 B1 | 1/2004 | Dutta |
| 6,720,860 B1 | 4/2004 | Narayanaswami |
| 6,757,713 B1 | 6/2004 | Ogilvie et al. |
| 6,832,222 B1 | 12/2004 | Zimowski |
| 6,834,195 B2 | 12/2004 | Brandenberg et al. |
| 6,959,324 B1 | 10/2005 | Kubik et al. |
| 6,970,907 B1 | 11/2005 | Ullmann et al. |
| 7,020,494 B2 | 3/2006 | Spriestersbach et al. |
| 7,072,963 B2 | 7/2006 | Anderson et al. |
| 7,149,893 B1 | 12/2006 | Leonard et al. |
| 7,188,143 B2 | 3/2007 | Szeto |
| 7,237,002 B1 | 6/2007 | Estrada et al. |
| 7,240,089 B2 | 7/2007 | Boudreau |
| 7,280,658 B2 | 10/2007 | Amini et al. |
| 7,349,768 B2 | 3/2008 | Bruce et al. |
| 7,356,564 B2 | 4/2008 | Hartselle et al. |
| 7,454,442 B2 | 11/2008 | Cobleigh et al. |
| 7,508,419 B2 | 3/2009 | Toyama et al. |
| 7,639,943 B1 | 12/2009 | Kalajan |
| 7,650,231 B2 | 1/2010 | Gadler |
| 7,856,360 B2 | 12/2010 | Kramer et al. |
| 8,032,586 B2 | 10/2011 | Challenger et al. |
| 8,090,351 B2 | 1/2012 | Klein |
| 8,099,109 B2 | 1/2012 | Altman et al. |
| 8,136,028 B1 | 3/2012 | Loeb et al. |
| 8,161,115 B2 | 4/2012 | Yamamoto |
| 8,161,417 B1 | 4/2012 | Lee |
| 8,195,203 B1 | 6/2012 | Tseng |
| 8,280,406 B2 | 10/2012 | Ziskind et al. |
| 8,285,199 B2 | 10/2012 | Hsu et al. |
| 8,287,380 B2 | 10/2012 | Nguyen et al. |
| 8,301,159 B2 | 10/2012 | Hamynen et al. |
| 8,326,315 B2 | 12/2012 | Phillips et al. |
| 8,326,327 B2 | 12/2012 | Hymel et al. |
| 8,352,546 B1 | 1/2013 | Dollard |
| 8,385,950 B1 | 2/2013 | Wagner et al. |
| 8,402,097 B2 | 3/2013 | Szeto |
| 8,510,383 B2 * | 8/2013 | Hurley .................. H04W 4/02 709/203 |
| 8,594,680 B2 | 11/2013 | Ledlie et al. |
| 8,613,089 B1 | 12/2013 | Holloway et al. |
| 8,660,369 B2 | 2/2014 | Llano et al. |
| 8,660,793 B2 | 2/2014 | Ngo et al. |
| 8,682,350 B2 | 3/2014 | Altman et al. |
| 8,732,168 B2 | 5/2014 | Johnson |
| 8,761,800 B2 * | 6/2014 | Kuwahara ............... A63F 13/35 455/456.3 |
| 8,768,876 B2 | 7/2014 | Shim et al. |
| 8,790,187 B2 * | 7/2014 | Walker .................. G07F 17/32 463/1 |
| 8,798,646 B1 | 8/2014 | Wang et al. |
| 8,886,227 B2 | 11/2014 | Schmidt et al. |
| 8,972,357 B2 | 3/2015 | Shim et al. |
| 9,020,745 B2 | 4/2015 | Johnston et al. |
| 9,119,027 B2 | 8/2015 | Sharon et al. |
| 9,143,382 B2 | 9/2015 | Bhogal et al. |
| 9,152,477 B1 | 10/2015 | Campbell et al. |
| 9,439,041 B2 | 9/2016 | Parvizi et al. |
| 9,450,907 B2 | 9/2016 | Pridmore et al. |
| 9,521,515 B2 | 12/2016 | Zimerman et al. |
| 9,628,950 B1 | 4/2017 | Noeth et al. |
| 9,710,821 B2 | 7/2017 | Heath |
| 9,801,018 B2 | 10/2017 | Zimerman et al. |
| 9,854,219 B2 | 12/2017 | Sehn |
| 2002/0097257 A1 | 7/2002 | Miller et al. |
| 2003/0001846 A1 | 1/2003 | Davis et al. |
| 2003/0020623 A1 | 1/2003 | Cao et al. |
| 2003/0126215 A1 | 7/2003 | Udell |
| 2003/0148773 A1 | 8/2003 | Spriestersbach et al. |
| 2003/0229607 A1 | 12/2003 | Zellweger et al. |
| 2004/0078367 A1 | 4/2004 | Anderson et al. |
| 2004/0203959 A1 | 10/2004 | Coombes |
| 2005/0022211 A1 | 1/2005 | Veselov et al. |
| 2005/0198128 A1 | 9/2005 | Anderson |
| 2006/0107297 A1 | 5/2006 | Toyama et al. |
| 2006/0114338 A1 | 6/2006 | Rothschild |
| 2006/0252438 A1 | 11/2006 | Ansamaa et al. |
| 2007/0073823 A1 | 3/2007 | Cohen et al. |
| 2007/0198495 A1 | 8/2007 | Buron et al. |
| 2007/0208751 A1 | 9/2007 | Cowan et al. |
| 2007/0255456 A1 | 11/2007 | Funayama |
| 2007/0281690 A1 | 12/2007 | Altman et al. |
| 2008/0055269 A1 | 3/2008 | Lemay et al. |
| 2008/0147730 A1 | 6/2008 | Lee et al. |
| 2008/0148150 A1 | 6/2008 | Mall |
| 2008/0168033 A1 | 7/2008 | Ott et al. |
| 2008/0207176 A1 | 8/2008 | Brackbill et al. |
| 2008/0214210 A1 | 9/2008 | Rasanen et al. |
| 2008/0313346 A1 | 12/2008 | Kujawa et al. |
| 2008/0318616 A1 | 12/2008 | Chipalkatti et al. |
| 2009/0006191 A1 | 1/2009 | Arankalle et al. |
| 2009/0030774 A1 | 1/2009 | Rothschild et al. |
| 2009/0042588 A1 | 2/2009 | Lottin et al. |
| 2009/0089710 A1 | 4/2009 | Wood et al. |
| 2009/0132453 A1 | 5/2009 | Hangartner et al. |
| 2009/0157450 A1 | 6/2009 | Athsani et al. |
| 2009/0163182 A1 | 6/2009 | Gatti et al. |
| 2009/0232354 A1 | 9/2009 | Camp, Jr. et al. |
| 2009/0234815 A1 | 9/2009 | Boerries et al. |
| 2009/0249244 A1 | 10/2009 | Robinson et al. |
| 2009/0288022 A1 | 11/2009 | Almstrand et al. |
| 2010/0100568 A1 | 4/2010 | Papin et al. |
| 2010/0185665 A1 | 7/2010 | Horn et al. |
| 2011/0010205 A1 | 1/2011 | Richards |
| 2011/0029512 A1 | 2/2011 | Folgner et al. |
| 2011/0064388 A1 | 3/2011 | Brown et al. |
| 2011/0066743 A1 | 3/2011 | Hurley et al. |
| 2011/0083101 A1 | 4/2011 | Sharon et al. |
| 2011/0119133 A1 | 5/2011 | Igelman et al. |
| 2011/0137881 A1 | 6/2011 | Cheng et al. |
| 2011/0159890 A1 | 6/2011 | Fortescue et al. |
| 2011/0164163 A1 | 7/2011 | Bilbrey et al. |
| 2011/0213845 A1 | 9/2011 | Logan et al. |
| 2011/0215966 A1 | 9/2011 | Kim et al. |
| 2011/0238763 A1 | 9/2011 | Shin et al. |
| 2011/0282799 A1 | 11/2011 | Huston |
| 2011/0320373 A1 | 12/2011 | Lee et al. |
| 2012/0059722 A1 | 3/2012 | Rao |
| 2012/0123830 A1 | 5/2012 | Svendsen et al. |
| 2012/0124126 A1 | 5/2012 | Alcazar et al. |
| 2012/0124458 A1 | 5/2012 | Cruzada |
| 2012/0172062 A1 | 7/2012 | Altman et al. |
| 2012/0184248 A1 | 7/2012 | Speede |
| 2012/0278692 A1 | 11/2012 | Shi |
| 2012/0304080 A1 | 11/2012 | Wormald et al. |
| 2013/0006759 A1 | 1/2013 | Srivastava et al. |
| 2013/0036364 A1 | 2/2013 | Johnson |
| 2013/0071093 A1 | 3/2013 | Hanks et al. |
| 2013/0086072 A1 | 4/2013 | Peng et al. |
| 2013/0129252 A1 | 5/2013 | Lauper et al. |
| 2013/0191198 A1 | 7/2013 | Carlson et al. |
| 2013/0194301 A1 | 8/2013 | Robbins et al. |
| 2013/0218965 A1 | 8/2013 | Abrol et al. |

(56) References Cited

U.S. PATENT DOCUMENTS

| | | |
|---|---|---|
| 2014/0032682 A1 | 1/2014 | Prado et al. |
| 2014/0045530 A1 | 2/2014 | Gordon et al. |
| 2014/0096029 A1 | 4/2014 | Schultz |
| 2014/0114565 A1 | 4/2014 | Aziz et al. |
| 2014/0122787 A1 | 5/2014 | Shalvi et al. |
| 2014/0161316 A1 | 6/2014 | Golan et al. |
| 2014/0173424 A1 | 6/2014 | Hogeg et al. |
| 2014/0258405 A1* | 9/2014 | Perkin .................. H04W 4/021 709/204 |
| 2014/0266703 A1 | 9/2014 | Dalley, Jr. et al. |
| 2014/0279540 A1 | 9/2014 | Jackson |
| 2014/0282096 A1 | 9/2014 | Rubinstein et al. |
| 2014/0324629 A1 | 10/2014 | Jacobs |
| 2015/0169827 A1 | 6/2015 | Laborde |
| 2015/0261917 A1 | 9/2015 | Smith |
| 2015/0356101 A1 | 12/2015 | Cohen et al. |
| 2015/0356102 A1 | 12/2015 | Cohen et al. |
| 2015/0356190 A1 | 12/2015 | Rotem et al. |
| 2015/0356191 A1 | 12/2015 | Rotem et al. |
| 2016/0014063 A1 | 1/2016 | Hogeg et al. |
| 2016/0219402 A1 | 7/2016 | Zimerman et al. |
| 2017/0006094 A1 | 1/2017 | Abou Mahmoud et al. |
| 2017/0061308 A1 | 3/2017 | Chen et al. |
| 2017/0086021 A1 | 3/2017 | Zimerman et al. |

OTHER PUBLICATIONS

"U.S. Appl. No. 14/805,489, Final Office Action dated Jan. 21, 2016", 12 pgs.

"U.S. Appl. No. 14/805,489, Final Office Action dated Feb. 17, 2016", 12 pgs.

"U.S. Appl. No. 14/805,489, Non Final Office Action dated Sep. 25, 2015", 12 pgs.

"U.S. Appl. No. 14/805,489, Notice of Allowance dated Aug. 10, 2016", 9 pgs.

"U.S. Appl. No. 14/805,489, Response filed Jul. 20, 2016 to Final Office Action dated Jan. 21, 2016", 11 pgs.

"U.S. Appl. No. 14/805,489, Response filed Dec. 28, 2015 to Non Final Office Action dated Sep. 25, 2015", 10 pgs.

"U.S. Appl. No. 15/371,379, Notice of Allowance dated Feb. 24, 2017", 12 pgs.

"U.S. Appl. No. 15/371,379, Notice of Allowance dated Jun. 13, 2017", 11 pgs.

"BlogStomp", [Online]. Retrieved from the Internet: <URL:http://stompsoftware.com/blogstomp>, (accessed May 24, 2017), 12 pgs.

"Daily App: InstaPlace (iOS/Android): Give Pictures a Sense of Place", TechPP, [Online]. Retrieved from the Internet: <URL;http://techpp.com/2013/02/15/instaplace-app-review>, (2013), 13 pgs.

Carthy, Roi, "Dear All Photo Apps: Mobli Just Won Filters", [Online]. Retrieved from the Internet: URL<https://techcrunch.com/2011/09/08/mobli-filters>, (Sep. 8, 2011), 10 pgs.

MacLeod, Duncan, "Macys Believe-o-Magic App", [Online]. Retrieved from the Internet: <URL:http://theinspirationroom.com/daily/2011/macys-believe-o-magic-app>, (Nov. 14, 2011), 10 pgs.

MacLeod, Duncan, "Starbucks Cup Magic—Let's Merry", {Online}. Retrieved from the Internet: <URL; http://theinspirationroom.com/daily/2011/starbucks-cup-magic>, (Nov. 12, 2011), 8 pgs.

Tripathi, Rohit, "Watermark Images in PHP and Save File on Server", [Online], Retrieved from the Internet: <URL:http://code.rohitink.com/2012/12/28/watermark-images-in-php-and-save-file-on-server/, (Dec. 28, 2012), 4 pgs.

"U.S. Appl. No. 15/712,926, Corrected Notice of Allowability dated Jun. 28, 2018", 14 pgs.

"U.S. Appl. No. 15/712,926, Corrected Notice of Allowability dated Jul. 9, 2018", 14 pgs.

\* cited by examiner

CONTENT REQUEST BY LOCATION

RELATED APPLICATIONS

This application is a continuation of U.S. patent application Ser. No. 15/371,379 filed on Dec. 7, 2016, which is a continuation of U.S. patent application Ser. No. 14/805,489 filed on Jul. 22, 2015, now issued as U.S. Pat. No. 9,521,515, which claims the benefit of priority under 35 USC 119(e) of U.S. Provisional Patent Application No. 62/107,588 filed on Jan. 26, 2015, the contents of each being incorporated herein by reference in their entirety.

FIELD AND BACKGROUND OF THE INVENTION

The present invention, in some embodiments thereof, relates to acquiring media content and, more particularly, but not exclusively, to acquiring media content by matching geographic locations of events and users.

People who are interested in media from a real-life event may search this media over the internet, for example in news websites, blogs etc. People may also view media content from an event when such media is posted by others who attended the event, for example in social network platforms. Many of these media content items are created and uploaded by users using mobile devices such as smartphones and/or tablet computers.

SUMMARY OF THE INVENTION

According to an aspect of some embodiments of the present invention, there is provided a method of obtaining media content of an event, comprising: identifying a real-life event, a time of the real-life event and a geographic location of the real-life event; identifying a subset of a plurality of client terminals of users located in proximity to the geographic location of the real-life event at the time of the real-life event; sending a message to the subset of client terminals containing a request to acquire media content documenting the real-life event; and receiving at least one media content item documenting the real-life event from at least one client terminal of the subset of client terminals, the at least one media content item acquired by at least one user of the users using the at least one client terminal in response to the message.

Optionally, the method further comprises: identifying a second subset of the plurality of client terminals of users potentially interested in the real-life event; and automatically providing the at least one media content item to the second subset of client terminals.

More optionally, the providing includes sending a message with a reference to a web document containing the at least one media content item.

Optionally, the method further comprises: providing the at least one media content item to at least one client terminal of the subset of client terminals of users potentially interested in the real-life event.

More optionally, the providing includes sending a message with a reference to a web document containing the at least one media content item.

Optionally, the identifying of the real-life event comprises: receiving a message from a first client terminal of the plurality of client terminals, the message containing a request from a user of the first client terminal to receive a media content documenting the real-life event.

More optionally, the method further comprises: providing the at least one media content item to the first client terminal.

Optionally, the identifying of the real-life event includes identifying a search action of the real-life event by a first client terminal of the plurality of client terminals.

More optionally, the method further comprises: providing the at least one media content item to the first client terminal.

Optionally, the identifying of the real-life event includes using an automatic algorithm connected to at least one events source.

Optionally, the identifying of the real-life event is done manually by entering event details into an event dataset.

Optionally, the method further comprises: sending a message with a reference to a web document containing the at least one media content item to at least one client terminal of the plurality of client terminals.

Optionally, the method further comprises: providing the at least one media content item to at least one third party to be presented by the third party in relation to the real-life event.

Optionally, the identifying of the subset of client terminals comprises: monitoring geographic locations of the plurality of client terminals; and automatically identifying when at least one of the plurality of client terminals is located in proximity to the geographic location of the real-life event.

Optionally, the identifying of the subset of client terminals includes accessing at least one calendar stored in a memory of at least one of the plurality of client terminals.

Optionally, the identifying includes ranking of the subset of client terminals according to past media content items received from each of the plurality of client terminals.

Optionally, the message includes instructions for acquiring the media content item.

Optionally, the message includes coordinates of the geographic location of the real-life event to be included in a map that indicates the geographic location and presented on a screen of each of the subset of client terminals.

Optionally, the message includes text instructions to arrive at a geographic location and/or coordinates of the geographic location of the real-life event to be included in a map that indicates the geographic location. The text instructions and the map are presented on a screen of each of the subset of client terminals.

More optionally, the map includes multiple identified geographic locations of real-life events.

Optionally, the message includes instructions for connecting the media content item to the real-life event.

Optionally, the at least one media content item is received by a message with a reference to a web document containing the at least one media content item.

Optionally, the at least one user is credited for acquiring the at least one media content item.

Optionally, the at least one media content item is aggregated with other media content items.

According to some embodiments of the invention, there is provided a computer readable medium comprising computer executable instructions adapted to perform the method.

According to an aspect of some embodiments of the present invention, there is provided a system for obtaining media content of an event, comprising: an event module that identifies a real-life event, a time of the real-life event and a geographic location of the real-life event; a tracking module that identifies a subset of a plurality of client terminals of users located in proximity to the geographic location of the real-life event at the time of the real-life event; and a communication module that: sends a message to the subset of client terminals containing a request to acquire media content documenting the real-life event; and receives at least one media content item documenting the real-life event from at least one client terminal of the subset of client terminals, the at least one media content item acquired by at least one user of the users using the at least one client terminal in response to the message.

Optionally, the method further comprises: an event dataset for storing the real-life event, the time of the real-life event and the geographic location of the real-life event.

Optionally, the method further comprises: a media dataset for storing the at least one media content item.

Optionally, the method further comprises: an aggregation module that aggregates the media content item with other media content items.

Optionally, the event module receives event details from an event algorithm that analyzes information from at least one events source.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL
VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Figure 1:
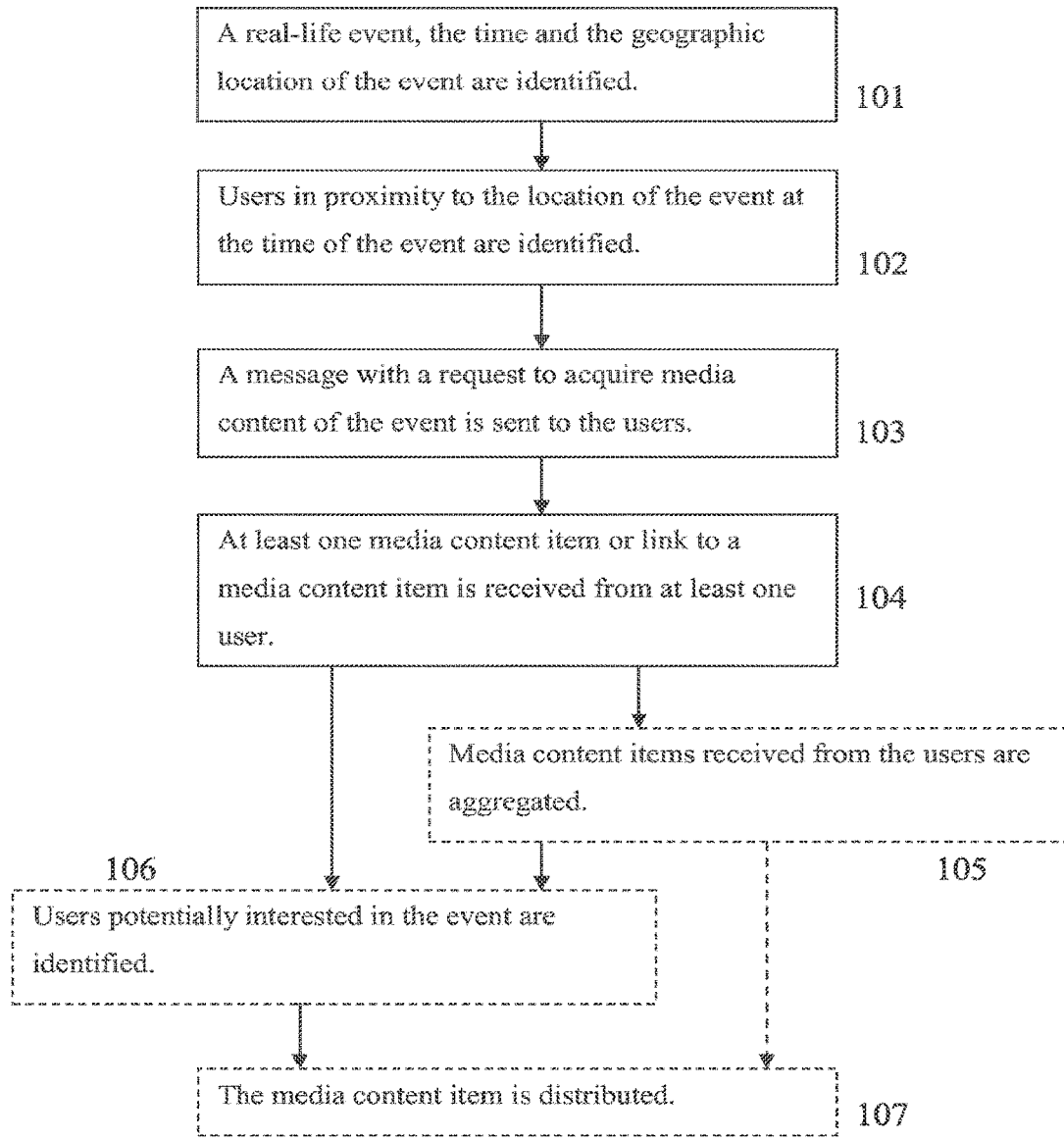
FIG. 1 is a flowchart schematically representing a method for obtaining media content documenting an event by requesting a user located in proximity to the event at the time of the event to acquire the media, according to some embodiments of the present invention.

DESCRIPTION OF SPECIFIC EMBODIMENTS
OF THE INVENTION

The present invention, in some embodiments thereof, relates to acquiring media content and, more particularly, but not exclusively, to acquiring media content by matching geographic locations of events and users.

According to some embodiments of the present invention, there are provided methods and systems for acquiring media content, such as images, videos, voice recordings and/or text, documenting a real-life event such as a concert, a sport game or a demonstration, by requesting users who are in proximity to the event at the time of the event, to acquire the media content.

When the method is applied, a real-life event and geographic location are identified. This is done either by receiving requests from users interested in the event, automatically by an algorithm that scans multiple sources and/or manually. Client terminals of users in proximity to the geographic location of the event at the time of the event are identified, for example by a global positioning system (GPS) device of the client terminals. A message is then sent to the client terminals, containing a request to acquire media content documenting the event. The user may then respond by acquiring a media content item, for example take a photo of the event using the camera of his mobile phone, and upload it to the system. The media content items acquired by the users of the client terminals are then received by the system.

Optionally, the media content is then distributed, for example sent to the users who requested for the media content, sent to other users potentially interested in the event, posted online as part of other content relating to the event and/or provided to third parties.

The method allows users to act as momentary reporters and provide media content from their position, for example current position, knowing that their media content is requested, and may be viewed by multiple people and not just their friends. The method has the advantage of receiving media content in real-time, from events that may be unpredicted, remote and/or too obscure to send a reporter. Also, the method allows users to request media from events they are interested in. The media content documenting an event may be received from multiple users, therefore having the advantages of multi-perspective coverage of the event.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN) or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
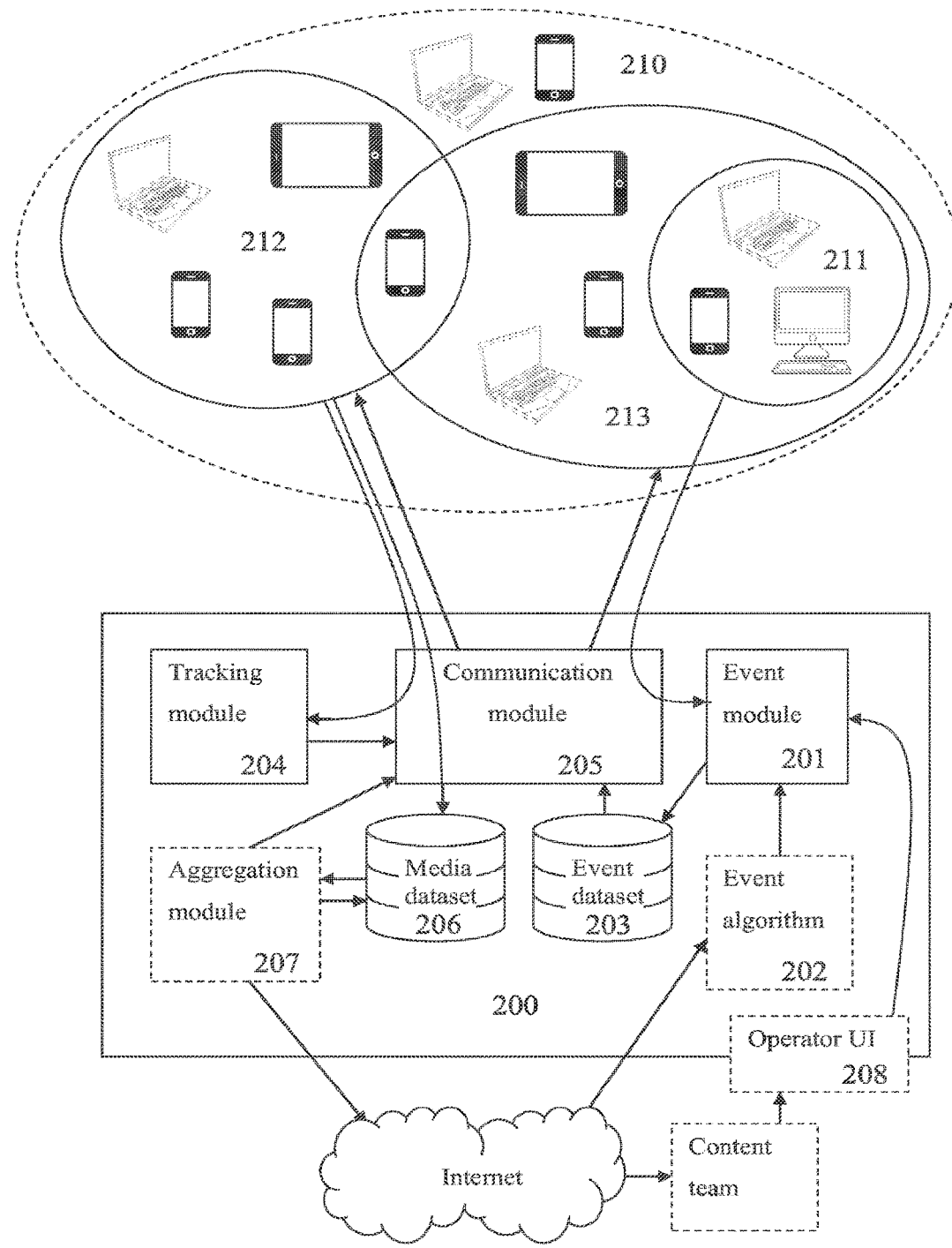
FIG. 2 is a schematic illustration of a system for obtaining media content documenting an event by requesting a user located in proximity to the event at the time of the event to acquire the media, according to some embodiments of the present invention.

Referring now to the drawings, FIG. 1 is a flowchart schematically representing a method of obtaining media content documenting an event by requesting a user located in proximity to the event at the time of the event to acquire the media, according to some embodiments of the present invention. Reference is also made to FIG. 2, which is a schematic illustration of a system of obtaining media content documenting an event by requesting a user located in proximity to the event at the time of the event to acquire the media, according to some embodiments of the present invention.

System 200 may include one or more computing devices, for example, a mainframe computer, an enterprise server, a workstation, multiple connected computers and/or a personal computer.

System 200 is connected via a network to multiple client terminals 210, each used by a user. The network may include, for example, local area network (WLAN), a wireless network such as mobile network, wireless local area network (WLAN) such as Wireless Fidelity (WiFi™), a wireless personal area network (WPAN) such as Bluetooth™ protocol and/or any other network.

Client terminals 210 may include, for example, a mobile device such as a Smartphone, a tablet, a wearable device such as Google glass, a Smart watch, a laptop computer and/or the like, a personal computer and/or any device that has one or more network communication modules, such as a network card or chip and runs a web-browser.

Each client terminal may include a program such as an App Store application or a Google Play application installed in the client terminal, a native operating system application and/or a browser add-on.

First, as shown in 101, a real-life event, the time of the event and the geographic location of the event are identified by an event module 201. The time of the event may be the current time for currently occurring events or may be a future time, for future events.

The real-life event may be, for example, a multi participant event such as a concert, a demonstration, a conference, and/or a sport game, a natural event such as a weather phenomena and/or an eclipse, and/or any other occasion or incident. The real-life event may also be general, for example, a city during a time period of a few months. The real-life event may be scheduled in advance or occurring as an outcome of circumstances, for instance a terror attack and/or a gathering of people induced by a presence of a celebrity, an artist and/or the like. For brevity, a real-life event may be referred to herein as an event.

Optionally, the event identification is done by receiving requests from a subset of client terminals 211 of client terminals 210 of users interested in receiving media content form the event. A user of one of client terminals 211 may perform a search for the event and/or may actively request for media content to be acquired. For example, a user is interested in seeing photos of a concert currently taking place. The request may include specific instruction, locations and/or items in the event. For example: "Please show the crowd roar after a goal in the game in Old Trafford". The request may be for a current event or for a future event. Optionally, the request may be a search action of the event by a user of one of client terminals 210. The search action may include, for example, the name of the event, the date or time of the event and/or any other detail related to the event.

Optionally, the request is indicative of specific information that should be included in the media content. Optionally, the specific information is of interest to a specific user of one of client terminals 211, for example to provide an answer to a specific question. For example, a request for an image of a nightclub or a queue to the post office, to indicate whether the place is currently crowded.

Optionally, a user who accesses a web document, such as a webpage displaying an article, an image, or a video (e.g. file or stream) about a held or a currently held event, is presented with a graphical user interface (GUI) that allows him to request for media content relating to the event. Optionally, a request is received from an agent of a third party such as a news agency and/or a media company, for example via an application programming interface (API).

Optionally, the event identification is done by an automatic event algorithm 202. Automatic event algorithm 202 may use any source of information available on the internet and/or specialized sources, for example, databases of events, rich site summary (RSS), news websites, user-generated content such as social networks, forums and/or blogs, search engines, official websites (such as of bands and/or sport leagues) and/or any other source. Optionally, the event identification is done as described in U.S. Provisional Patent Application No. 62/007,974, filed on Jun. 5, 2014 which is incorporated here by reference.

Optionally, the event identification is done by manually providing events and their geographic location to event module 201, for example via an operator user interface (UI) 208. This may be performed, for example, by employees of a content team using operator UI 208. Content team may use any source of information as described above.

Optionally, an event is identified when potential use of media content documenting the event is identified, for example when the event is mentioned in news articles, event feeds, social media posts, chats and/or any combination thereof.

Optionally, an event is identified only after indication of interest from several sources, for example, multiple requests from client terminals 211, a request from one of client terminals 211 and also mentions in social networks and/or several mentions in news reports. For example, an event is not identified when media content documenting the event is requested by one user, however, when the event is also mentioned in a news website, the event is identified.

Events identified by event module 201 may be stored in an event dataset 203.

Event dataset 203 may be any kind of structured data collection that allows access to stored data. Event dataset 203 may be stored, for example, in a digital data storage unit such as a magnetic drive and/or a solid state drive. Optionally, entries of events stored in event dataset 203 may be processed, for example by a merge algorithm that merges entries that were created as separate events but actually indicative of the same event.

Then, as shown in 102, a subset 212 of client terminals 210, which are used by users currently located in proximity to the geographic location of the event at the time of the event, is identified by a tracking module 204.

Optionally, client terminals 212 are identified by monitoring the geographic location of client terminals 210. The geographic location may be determined, for example, by a positioning system included in each of client terminals 210 such as global positioning system (GPS), triangulation of cellular network, Wireless Fidelity (WiFi™) network and/or any other locating method.

Optionally, users of client terminals 212 are ranked according to past uploads of media content. Optionally, users are identified as having better potential to respond to the request, for example, users who responded to requests in the past and/or uploaded media content to social networks are identified and ranked high. Optionally, users are identified as having better potential to produce quality uploads, for example according to quality of past uploads.

Optionally, users who are expected to be in proximity to the geographic location of the event at the time of the event are identified prior to the event, for example, by connecting to calendars stored on client terminals 210 and identifying future calendar events that are in geographic proximity and time proximity to the event.

Then, as shown in 103, a message is sent by a communication module 205 to client terminals 212. The message contains a request to acquire media content documenting the event. The message may be sent prior to the event and/or during the time of the event.

Communication module 205 may be, for example, a hardware element such as a network adapter card and/or a software module such as a computer program.

The media content may include, for example, images, videos, voice recordings, text and/or any other media. The message may be sent, for example, via a messaging service of an application installed on each of client terminals 212, mobile notification of the application, via short message service (SMS), an instant messaging (IM), an email and/or by any other communication method. The message may include specific instructions for acquiring the media content, for example, as indicated in the requests sent from client terminals 211 and/or according to other existing media content. For example, when most existing videos are taken from one angle, users are asked to take videos from a different angle.

Optionally, a map or textual instructions segment is presented in client terminals 212 to indicate the geographic location of the event. The textual instructions may be calculated automatically from map data, navigation application or API and/or taken from a database. The coordinates of said geographic location may be included in the message. Optionally, the message contains a request that includes instructions for locating the event, for example: "There is a demonstration 400 m north of your location. Please show us what's going on". Optionally, the map includes multiple geographic locations of events for which media content is required.

Optionally, a chat is automatically established between the requestors and the user(s) who accept the request. For example, the chat is established as a group chat of an instant messaging platform and/or as an in application chat that is managed using a chat GUI as known in the art. This allows requestor to personally react to the uploaded content, optionally in real time, for example during a live feed of the content and/or immediately after the content is uploaded.

Then, as shown in 104, at least one media content item is received from at least one client terminal of client terminals 212 in response to the request message.

The media content item documenting the event and acquired by the user of the client terminal. The media content item may be acquired, for example, by sensors included in client terminals 212 such as built-in camera and/or recorder and/or by any other equipment. Optionally, media content items may be acquired by one device, such as a digital single-lens reflex camera (DSLR) and uploaded by a second device, such as a personal computer. Optionally, the media content item is received as a link to media content item uploaded to the internet, for example posted in a social network and/or personal blog.

Optionally, instructions are sent to users of client terminals 212 on how to connect the media content item to the right event, for example including suggested hash-tag(s) that could be used by a user to tag the media content item.

Optionally, media content items received from client terminals 212 are stored in a media dataset 206. Media dataset 206 may be any kind of structured data collection, as described above.

Then, optionally, as shown in 105, media content items received from client terminals 212 are aggregated by aggregation module 207. For example, a few images from the event are clustered, combined to create a collage, sorted to create a timeline of the event, sorted according to subject documented in the media items (for example artist, crowd, stage etc) and/or processed in any other way.

Then, optionally, as shown in 106, a subset 213 of client terminals 210, which are used by users potentially interested in the event, is identified. Client terminals 213 may include client terminals 211 of users that requested media content documenting the event and/or one or more of client terminals 212 which are in proximity to the event at the time of the event and may be interested in watching the event from a different angle or different interpretation. Optionally, client terminals 213 may also include one or more of client terminals 210 that are selected according to use patterns and are identified by an algorithm to identify users that were interested in this type of event in the past, for example according to visited websites, past requests, interests indicated by users for example in a configuration options and/or by any other method.

Then, optionally, as shown in 107, the media content is distributed by communication module 205, for example by messages. Optionally, the media content item is provided to client terminals 213 by a message which is sent by communication module 205 to client terminals 213, containing the media content item. The message may be any kind of message, as described above. Optionally, the media content item is provided by a message which contains a reference to a web document containing the media content. The web document that may be, for example, a webpage, an extensible markup language (XML) page, a hypertext markup language (HTML) page, a portable document format (PDF), an executable, an email, an audio and/or video file, an image and/or any other network accessible content file. The web document may be a webpage or any other network accessible destination. The web document may include, for example, a visual container that allows users to explore all the media content from the event. The reference to the web document may be, for example, a Uniform Resource Locator (URL) or a Universal Resource Identifier (URI). Optionally, the media content is distributed by an algorithm, for example an auto-article enrichment algorithm such as described in U.S. Provisional Patent Application No. 62/007,974. Optionally, a suggestion is sent to users of client terminals 213 to subscribe to media content documenting the event, for example by a hash-tag.

Optionally, the media content is distributed to third parties such as Media companies and/or news agencies. This may be implemented in a revenue share model. Optionally, payment is received from the third parties. Optionally, third parties are provided with access to media dataset 206, for example via an application programming interface (API).

Optionally, users are credited for uploading media content when requested.

For example, highly credited users are the first to receive media content documenting events and/or get priority when requesting media content. Optionally, users are paid when media content which they uploaded is sold to a third party.

Optionally, users are credited when media content which they uploaded is viewed, acknowledged and/or shared by others. Optionally, users are credited for accurately acquiring media content based on specific requests, for example, a show from a specific angle. Optionally, users requesting media content may initiate bidding for providing the required media content.

Optionally, the frequency of distributing the media content is adjusted, for example based on time, geographic location, other events and/or any other factor. For example, notifications to client terminals 213 may be frequent during the time of the event and less frequent when the event is over.

Optionally, the media content is distributed while new media is uploaded by client terminals 212 and is continuously aggregated by aggregation module 207.

Figure 3:
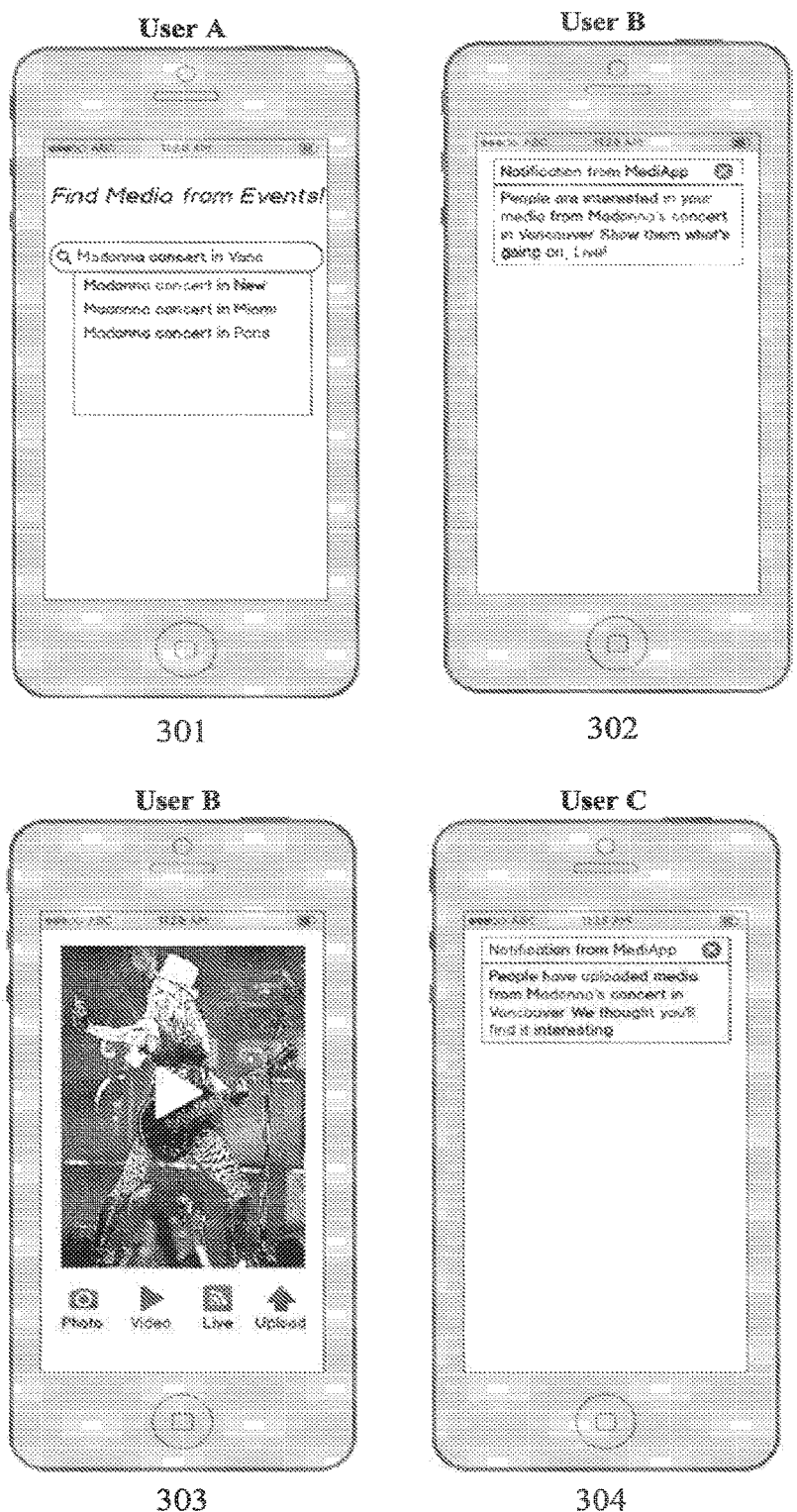
FIG. 3 is an exemplary application user interface (UI) of an application of obtaining media content documenting an event, according to some embodiments of the present invention.
Figure 4:
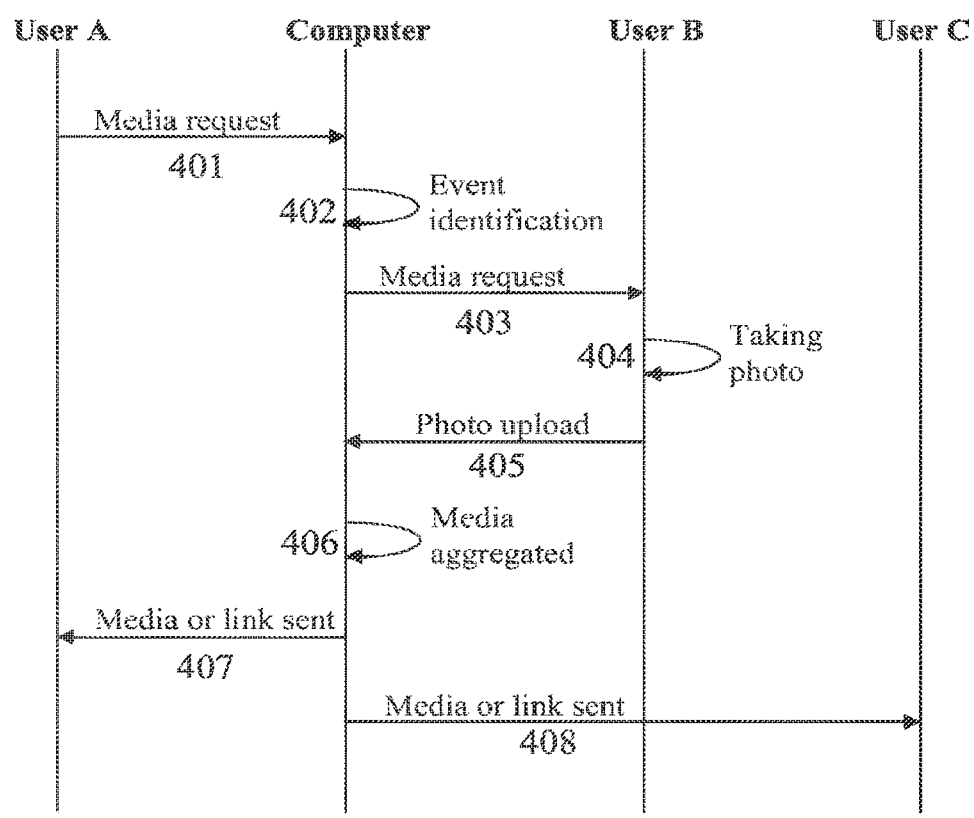
FIG. 4 is a sequence chart schematically representing an exemplary scenario of obtaining media content documenting an event, according to some embodiments of the present invention.

Reference is now made to FIG. 3, which is an exemplary application user interlace (UI) of an application of obtaining media content documenting an event, according to some embodiments of the present invention. Reference is also made to FIG. 4, which is a sequence chart schematically representing an exemplary scenario of obtaining media content documenting an event, according to some embodiments of the present invention.

First, as shown in 301 and in 401, a user A of group 211 of the application is searching for media from the Madonna concert which is about to start in Vancouver, the system may suggest other popular searches from Madonna (such as from the last days). Since the concert has not started yet, very few (if any) media items are available.

Then, as shown in 402, the system then identifies that the Madonna concert in Vancouver is an interesting event, as a substantial number of users are querying on it.

The system identifies the time of the concert and which venue holds the concert, for example by using internet sources, and identifies the cellular polygonal perimeter that holds the venue.

Then, as shown in 403, the system sends a notification to users of group 212, which are within the polygonal perimeter, such as shown in 302 which is a screenshot of the application of user B of group 212, which invites people to share what they are viewing right now.

Then, as shown in 404, User B of group 212 takes a photo of Madonna in the concert. As shown in 303, the application allows for a quick upload screen for different type of media.

Then, as shown in 405, user B of group 212 uploads the photo of Madonna to the server of the system. Once the image is uploaded, it is aggregated together with other media uploaded from the Madonna concert in Vancouver, as shown in 406.

Finally, when enough media is gathered from users at the Madonna concert in Vancouver, a notification is send to users who have shown interest in that event (and others), such as user C of group 213 as shown in 304 and 407, and/or such as user A of group 211 who requested for the media, as shown in 408.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application, many relevant methods and systems for acquiring media content will be developed and the scope of the term media content is intended to include all such new technologies a priori.

The terms "comprises", "comprising", "includes", "including", "having" and their conjugates mean "including but not limited to". This term encompasses the terms "consisting of" and "consisting essentially of".

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of obtaining media content of an event, comprising:
    identifying a subset of a plurality of client terminals of a plurality of users,
    client terminals of the subset being located in proximity to a geographic location of a real-life event at a time of the real-life event;
    sending a message to each client terminal of the subset, the message containing a request,
    to present on a respective display, to acquire media content documenting the real-life event in the geographic location, the request comprising instructions for imaging the real-life event;
    receiving, from a first client terminal of the subset, a media content item in response to the message,
    the media content item being acquired by the first client terminal of the subset and the media content item documenting the real-life event;
    providing the media content item to the second client terminal,
    the providing including sending a message with a reference to a network-accessible content file containing the media content item; and
    distributing, to a second client terminal, the media content item, the distributing occurring at a frequency determined based on at least one of the time and the geographic location of the real-life event.

2. The method of claim 1, wherein the distributing comprises distributing the media content item to the second client terminal while the media content item is being received from the first client terminal.

3. The method of claim 1, further comprising:
    identifying a second subset of the plurality of client terminals of users potentially interested in the real-life event; and
    providing the media content item to the second subset of client terminals.

4. The method of claim 3, wherein the providing includes sending a message with a reference to a network-accessible content file containing the media content item.

5. The method of claim 1, wherein the location and the geographic location of the real-life event is identified using a search action comprising searching at least one events source which is external to the client terminal.

6. The method of claim 1, wherein the location and the geographic location of the real-life event are manually provided by a user entering event details into an event dataset.

7. The method of claim 1, further comprising:
    sending a message with a reference to a network-accessible content file containing the media content item to at least some of the plurality of client terminals.

8. The method of claim 1, further comprising:
    providing the media content item to at least one third party to be presented by the at least one third party in relation to the real-life event.

9. The method of claim 1, wherein the identifying of the subset of client terminals comprises:
    monitoring geographic locations of the plurality of client terminals; and
    identifying when at least one of the plurality of client terminals is located in proximity to the geographic location of the real-life event.

10. The method of claim 1, wherein the identifying of the subset of client terminals includes accessing at least one calendar stored in a memory of at least one of the plurality of client terminals.

11. The method of claim 1, wherein the identifying includes ranking of the subset of client terminals according to past media content items received from each of the plurality of client terminals.

12. The method of claim 1, wherein the instructions include at least one text instruction to arrive at the geographic location, and coordinates of the geographic location of the real-life event to be included in a map that indicates the geographic location, wherein the at least one text instruction and the map are presented on a screen of each of the subset of client terminals.

13. The method of claim 12, wherein the map includes multiple identified geographic locations of real-life events.

14. The method of claim 1, wherein the media content item is received by a message with a reference to a network-accessible content file containing the media content item.

15. The method of claim 1, wherein the media content item is aggregated with other media content items.

16. A system for obtaining media content of an event, comprising: at least one network interface;
    a memory storing a code; and
    a processor coupled to the memory and the at least one network interface for executing the stored code, the code comprising:
        code instructions for identifying a subset of a plurality of client terminals of a plurality of users, client terminals of the subset being located in proximity to a geographic location of a real-life event at a time of the real-life event;
        code instructions for sending a message to each client terminal of the subset, the message containing a request, to present on a respective display, to acquire media content documenting the real-life event in the geographic location, the request comprising instructions for imaging the real-life event;
        code instructions for receiving, from a first client terminal of the subset, a media content item in response to the message, the media content item being acquired by the first client terminal of the subset and the media content item documenting the real-life event;
        code instructions for providing the media content item to the second client terminal, the providing including sending a message with a reference to a network-accessible content file containing the media content item; and
        code instructions for distributing, to a second client terminal, the media content item, the distributing occurring at a frequency determined based on at least one of the time and the geographic location of the real-life event.

17. The system of claim 16, further comprising:
    an event dataset for storing the real-life event, the time of the real-life event and the geographic location of the real-life event.

18. The system of claim 16, further comprising:
an aggregation module that aggregates the media content item with other media content items.

19. The system of claim 16, wherein the code further comprising code instructions which are executed by the at least processor for receiving event details from an event algorithm that analyzes information from at least one events source.

20. A non-transitory computer readable storage medium comprising computer executable instructions adapted to perform operations comprising:
identifying a subset of a plurality of client terminals of a plurality of users, client terminals of the subset being located in proximity to a geographic location of a real-life event at a time of the real-life event;
sending a message to each client terminal of the subset, the message containing a request, to present on a respective display, to acquire media content documenting the real-life event in the geographic location, the request comprising instructions for imaging the real-life event;
receiving, from a first client terminal of the subset, a media content item in response to the message, the media content item being acquired by the first client terminal of the subset and the media content item documenting the real-life event;
providing the media content item to the second client terminal, the providing including sending a message with a reference to a network-accessible content file containing the media content item; and
distributing, to a second client terminal, the media content item, the distributing occurring at a frequency determined based on at least one of the time and the geographic location of the real-life event.

21. The non-transitory computer readable storage medium of claim 20 wherein the distributing comprises distributing the media content item to the second client terminal while the media content item is being received from the first client terminal.

* * * * *